US006639384B2

(12) United States Patent
Hasegawa et al.

(10) Patent No.: US 6,639,384 B2
(45) Date of Patent: Oct. 28, 2003

(54) VEHICULAR POWER SUPPLY DEVICE

(75) Inventors: Tetsuya Hasegawa, Shizuoka-ken (JP); Yasuhiro Tamai, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/112,765

(22) Filed: Apr. 2, 2002

(65) Prior Publication Data

US 2002/0140397 A1 Oct. 3, 2002

(30) Foreign Application Priority Data

Apr. 3, 2001 (JP) ........................................ 2001-104486

(51) Int. Cl.[7] ............................................. H01M 10/46
(52) U.S. Cl. ....................................................... 320/126
(58) Field of Search ................................. 320/116, 118, 320/119, 120, 126, 127, 128, 137, 162, 163, 164

(56) References Cited

U.S. PATENT DOCUMENTS 5,334,926 A * 8/1994 Imaizumi

FOREIGN PATENT DOCUMENTS

JP 7-164982 6/1995

* cited by examiner

Primary Examiner—Edward H. Tso
(74) Attorney, Agent, or Firm—Finnegan, Henderson, Farabow, Garrett & Dunner, L.L.P.

(57) ABSTRACT

A vehicular power supply device which includes a generator, a high-voltage battery, a voltage converter, and a plurality of low-voltage batteries. The high-voltage battery is charged with power outputted from the generator and supplies the charged power to a high-voltage load. The voltage converter converts an output voltage of the high-voltage battery into another voltage. The plurality of low-voltage batteries respectively connected to the voltage converter in parallel, are charged with power outputted from the voltage converter and supply the charged power to a low-voltage load.

7 Claims, 4 Drawing Sheets

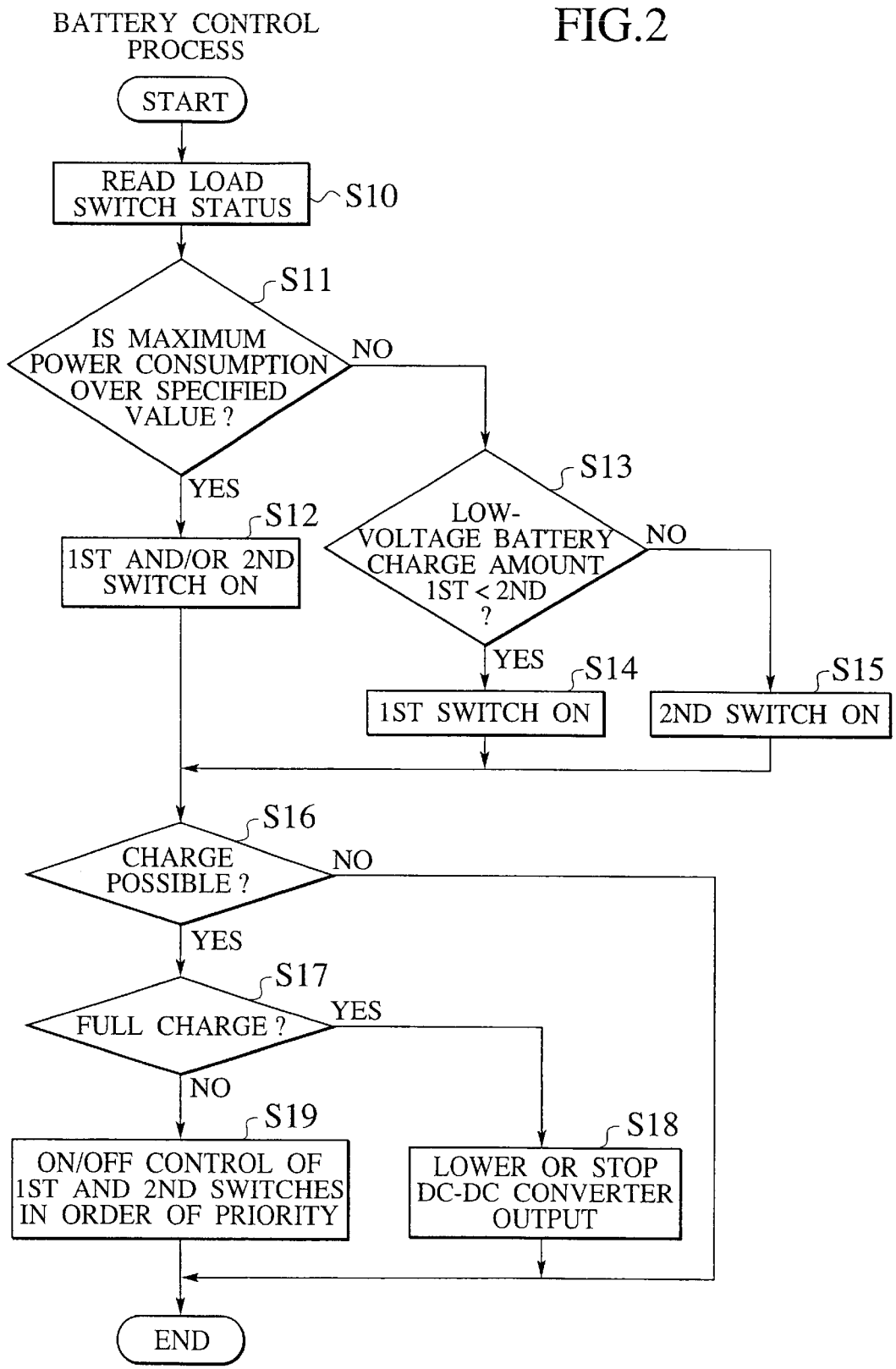

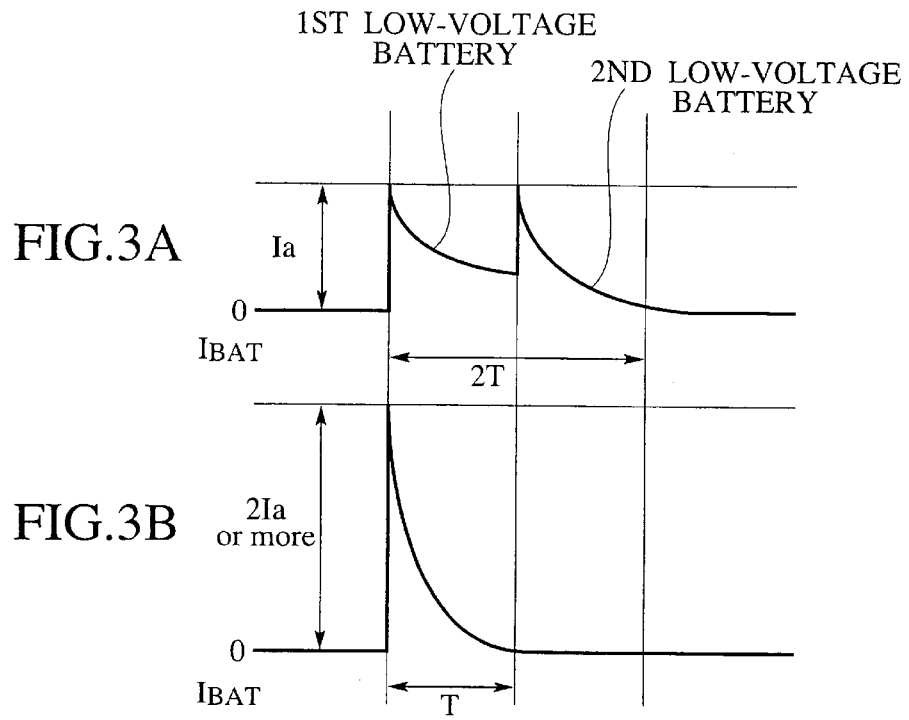
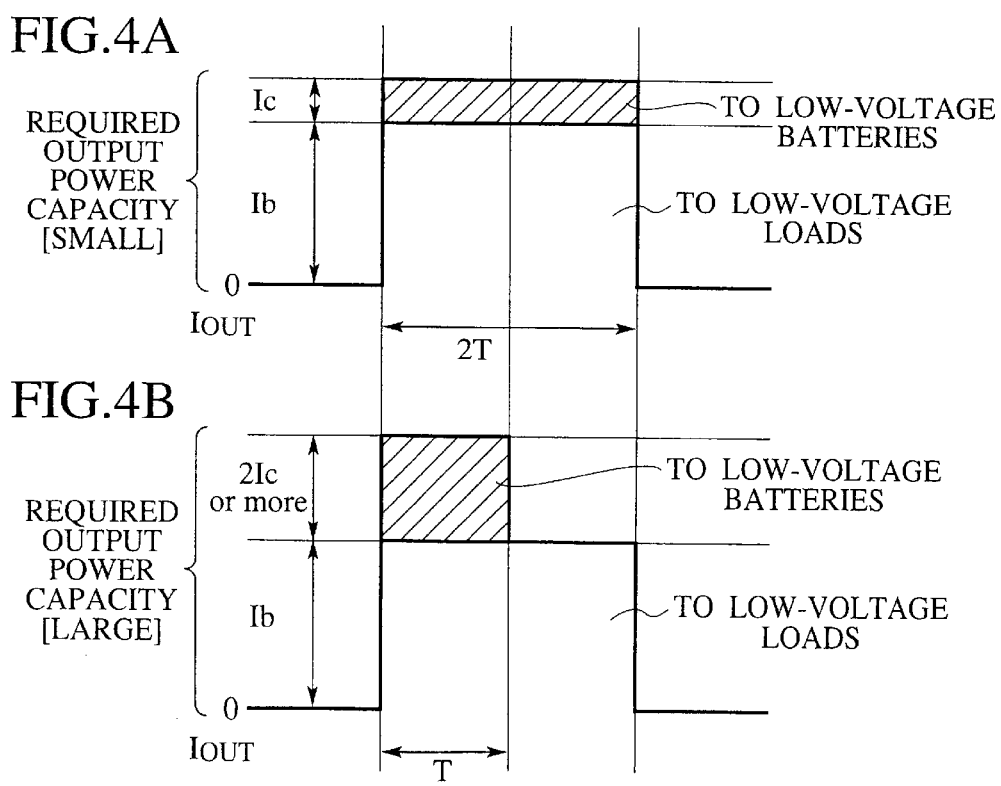

VEHICULAR POWER SUPPLY DEVICE

BACKGROUND OF THE INVENTION

1. Field of the Invention

The present invention relates to a vehicular power supply device, particularly to a technology of operating a generator and a battery in combination with each other.

2. Description of the Related Art

There has been a technology for suppressing an inrush current generated in a power supply system, to reduce a power supply capacity and a wiring capacity. Japanese Patent Application Laid-Open 7(1995)-164982 discloses a power supply system of the technology. In the power supply system, a controlled power application prevents occurrence of a momentary overload conditions such as inrush currents at the same time. When a switch is instructed to apply power to each load, if an over-current is being supplied to the load, CPU does not supply the power to the load, and after the current is lowered to a steady current, the CPU starts supplying the power to the load.

However, once a battery as a supplementary power supply of a generator for a DC-DC converter or the like is discharged, the battery acts as a load for the generator. When a load requiring a large current, such as a lamp, is driven, large power is instantly taken out of (or discharged from) the battery, and conversely, during a subsequent charge, the large power flows into the battery. Specifically, the charge/discharge of the battery, similarly to the load such as the lamp, generates a momentary peak of the large power resulting in an increased output of the generator to the whole system.

Moreover, since a capacity of the DC-DC converter in the system depends not only on the rated current of the loads but also on the charge current for the battery as described above, the converter becomes large in size and high in cost.

SUMMARY OF THE INVENTION

The object of the present invention is to provide a vehicular power supply device being low in cost and contributing to reducing a voltage converter capacity.

A first aspect of the present invention is a vehicular power supply device, comprising: a generator generating power; a high-voltage battery being charged with power outputted from the generator, the high-voltage battery supplying the charged power to a high-voltage load; a voltage converter converting an output voltage of the high-voltage battery into another voltage; and a plurality of low-voltage batteries respectively being connected to the voltage converter in parallel and being charged with power outputted from the voltage converter, the low-voltage battery supplying the charged power to a low-voltage load.

According to the first aspect of the present invention constituted as described above, since the vehicular power supply device includes the plurality of low-voltage batteries connected in parallel for driving the load, the capacity of the respective low-voltage battery can be smaller than that of a conventional vehicular power supply device with one battery. Consequently, an inrush current during the charge of the battery and an output power capacity of the voltage converter can be reduced, thus enabling miniaturization thereof.

A second aspect of the present invention is the vehicular power supply device according to the first aspect, further comprising: a control circuit selecting at least one low-voltage battery for supplying the power required for driving the low-voltage load among the plurality of low-voltage batteries.

According to the second aspect of the present invention constituted as described above, since at least one low-voltage battery for supplying the power required for driving the load is selected, it is possible to avoid a shortage of the power when power consumption of the load exceeds the maximum output power capacity of the voltage converter due to generation of the inrush current.

A third aspect of the present invention is the vehicular power supply device according to the second aspect, in which the control circuit allows the plurality of low-voltage batteries to be sequentially charged with the power outputted from the voltage converter.

According to the third aspect of the present invention constituted as described above, since the low-voltage batteries with a smaller capacity than that of the conventional battery are sequentially charged, an amount of the inrush current can be further reduced. Consequently, the output power capacity of the voltage converter can be reduced, thus enabling miniaturization thereof.

A fourth aspect of the present invention is the vehicular power supply device according to the second aspect, further comprising: detector for detecting a charge amount of the low-voltage battery, wherein, when the power required for driving the low-voltage load is smaller than a predetermined value, the control circuit allows a low-voltage battery having a small charge amount detected by the detector to be used for supplying the power prior to the other low-voltage batteries.

According to the fourth aspect of the present invention constituted as described above, since the low-voltage battery with a larger charge amount is always maintained in a state of having the larger charge amount or of being fully charged, the low-voltage battery can be used as an auxiliary, thus avoiding a trouble due to battery depletion.

Preferably, the detector is configured with a current sensor for detecting a charge/discharge current of the low-voltage battery and a voltage sensor for detecting a voltage of a terminal thereof, the current and the voltage detected by the detector are sent to the control circuit, the control circuit calculates the charge amount based on the charge/discharge current and stores the calculated charge amount.

BRIEF DESCRIPTION OF THE DRAWINGS

The invention will now be described with reference to the accompanying drawings, wherein:

FIG. 2 is a flowchart for explaining a battery control process of the vehicular power supply device according to the first embodiment of the present invention;

FIG. 3A and FIG. 3B is a graph for explaining a battery charging operation of the vehicular power supply device according to the first embodiment of the present invention, showing a charge current transition in the operation;

FIG. 4A and FIG. 4B is a graph for explaining the battery charging operation of the vehicular power supply device according to the first embodiment of the present invention, showing a required output power capacity for the operation.

DETAILED DESCRIPTION OF THE PREFERRED EMBODIMENT

Figure 1:
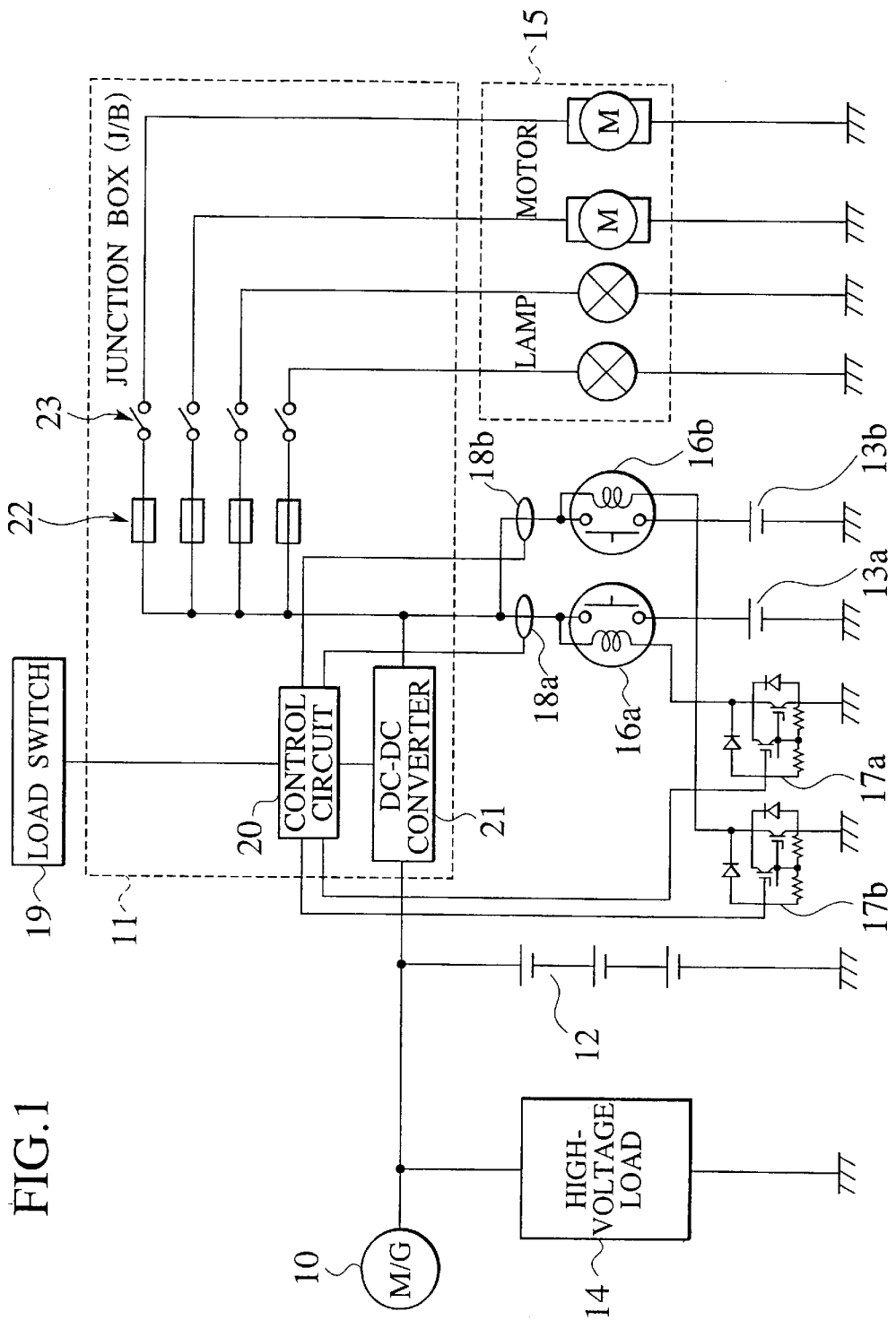
FIG. 1 is a block diagram showing a configuration of a vehicular power supply device according to a first embodiment of the present invention.

Preferred embodiments of the present invention will be explained below with reference to the drawings, wherein like members are designated by like reference characters.

First Embodiment

In a vehicular power supply device according to a first embodiment of the present invention, a DC-DC converter and a control circuit are accommodated in a junction box (J/B).

FIG. 1 is a block diagram showing a configuration of the vehicular power supply device according to the first embodiment. This vehicular power supply device is constituted of a motor generator (M/G) 10, a junction box (J/B) 11, a high-voltage battery 12, a first low-voltage battery 13a, a second low-voltage battery 13b (the two low-voltage batteries correspond to a plurality of low-voltage batteries of the present invention), a high-voltage load 14, low-voltage loads 15, a first switch 16a, a second switch 16b, a first switch drive circuit 17a, a second switch drive circuit 17b, a first detector 18a, a second detector 18b and a load switch 19.

A control circuit 20, a DC-DC converter 21, fuses 22 and switch elements 23 are accommodated in the junction box 11.

The motor generator 10, corresponding to a generator of the present invention, is driven by an engine (not shown) to generate direct current power, and is connected to an input/output terminal of the high-voltage battery 12 and input terminals of the high-voltage load 14 and the DC-DC converter 21. The direct current power generated by the motor generator 10 is supplied to the input/output terminal of the high-voltage battery 12 and the input terminals of the high-voltage load 14 and the DC-DC converter 21.

The high-voltage battery 12 stores and outputs a power of high voltage, for example, as high as 42 V. This high-voltage battery 12 is charged with direct current power of high voltage from the motor generator 10. Moreover, high-voltage power from the high-voltage battery 12 is supplied to the high-voltage load 14 and the DC-DC converter 21.

The first low-voltage battery 13a stores and outputs a power of low voltage, for example, as low as 12 V. A capacity of the first low-voltage battery 13a is approximately a half of a conventional low-voltage battery. An input/output terminal of the first low-voltage battery 13a is connected to an output terminal of the DC-DC converter 21 and terminals of the fuses 22 through the first switch 16a. The other terminals of the fuses 22 are connected to the low-voltage loads 15 through the switch elements 23.

The first low-voltage battery 13a is charged with direct current power of low voltage, which is supplied from the DC-DC converter 21 through the first switch 16a. Moreover, low-voltage power from the first low-voltage battery 13a is supplied to the low-voltage loads 15 through the first switch 16a, the fuses 22 and the switch elements 23.

The second low-voltage battery 13b stores and outputs a power of low voltage, for example, as low as 12 V. A capacity of the second low-voltage battery 13b is equal to that of the first low-voltage batter 13a, which is approximately a half of the conventional low-voltage battery. An input/output terminal of the second low-voltage battery 13b is connected through the second switch 16b to the output terminal of the DC-DC converter 21 and the terminals of the fuses 22. Specifically, the first low-voltage battery 13a and the second low-voltage battery 13b are connected in parallel through the first switch 16a and the second switch 16b, respectively. Accordingly, the sum of the capacity of the first low-voltage battery 13a and the capacity of the second low-voltage battery 13b is equal to that of the conventional low-voltage battery.

The second low-voltage battery 13b is charged with direct current of lowvoltage, which is supplied from the DC-DC converter 21 through the second switch 16b. Moreover, low-voltage power from the second low-voltage battery 13b is supplied to the low-voltage loads 15 through the second switch 16b, the fuses 22 and the switch elements 23.

These first low-voltage battery 13a and second low-voltage battery 13b compensate for a temporarily increased power requirement, for example, inrush currents to lamps. Furthermore, the first low-voltage battery 13a and the second low-voltage battery 13b are also used for driving a radio, the lamps and the like, to be used after an ignition switch is turned off.

The high-voltage load 14 is constituted of a plurality of loads, such as a motor for driving a wiper and a motor for driving power windows, and is driven by high-voltage power supplied from the motor generator 10 and the high-voltage battery 12.

The low-voltage loads 15 are a plurality of loads, such as lamps including headlights, tail lamps, interior lights, ignition plugs and motors, and are driven by low-voltage power supplied by the DC-DC converter 21 and/or at least one of the low-voltage batteries 13a and 13b.

As described above, the first switch 16a is provided between the DC-DC converter 21 and the first low-voltage battery 13a and used for controlling charge/discharge of the first low-voltage battery 13a. The first switch 16a can be constituted of, for example, a relay.

Open/close control for the first switch 16a is carried out by the first switch drive circuit 17a connected to a control terminal thereof. The first switch drive circuit 17a drives the first switch 16a in response to a control signal from the control circuit 20 and controls the open/close of the first switch 16a.

As described above, the second switch 16b is provided between the DC-DC converter 21 and the second low-voltage battery 13b and is used for controlling charge/discharge of the second low-voltage battery 13b. The second switch 16b can be constituted of, for example, a relay.

Open/close control for the second switch 16b is carried out by the second switch drive circuit 17b connected to a control terminal thereof. The second switch drive circuit 17b drives the second switch 16b in response to the control signal from the control circuit 20 and controls the open/close of the second switch 16b.

The first detector 18a is provided between the output terminal of the DC-DC converter 21 and the first switch 16a. The first detector 18a is constituted of a current sensor for detecting a charge/discharge current of the first low-voltage battery 13a and a voltage sensor for detecting a voltage of the input/output terminal of the first low-voltage battery 13a. Current and voltage values detected by the first detector 18a are sent to the control circuit 20.

The second detector 18b is provided between the output terminal of the DC-DC converter 21 and the second switch 16b. The second detector 18b is constituted of a current sensor for detecting a charge/discharge current of the second low-voltage battery 13b and a voltage sensor for detecting a voltage of the input/output terminal of the second low-voltage battery 13b. Current and voltage values detected by the second detector 18b are sent to the control circuit 20.

The control circuit 20 is constituted of, for example, a microprocessor, and is connected to the DC-DC converter 21, a control terminal (not shown) of the switch elements 23, the first switch drive circuit 17a, the second switch drive circuit 17b, the first detector 18a, the second detector 18b and the load switch 19.

The control circuit 20 controls a high-voltage system and a low-voltage system of the vehicular power supply device. The control of the high-voltage system includes start/stop control for power generation of the motor generator 10, charge/discharge control for the high-voltage battery 12, on/off control for the high-voltage load 14 and the like. Moreover, as will be described later, the control of the low-voltage system includes control for a conversion operation of the DC-DC converter 21, charge/discharge control of the first low-voltage battery 13a and the second low-voltage battery 13b, on/off control for the low-voltage loads 15 and the like.

The DC-DC converter 21 corresponds to a voltage converter of the present invention. An input terminal of the DC-DC converter 21 is connected to an output terminal of the motor generator 10 and the input/output terminal of the high-voltage battery 12. Moreover, the output terminal of the DC-DC converter 21 is connected to the input/output terminal of the first low-voltage battery 13a through the first switch 16a, and to the input/output terminal of the second low-voltage battery 13b through the second switch 16b, and further to the terminals of the fuses 22. Moreover, the control terminal of the DC-DC converter 21 is connected to the control circuit 20.

The DC-DC converter 21 converts a high voltage (i.e., a direct current voltage of 42 V) supplied from the high-voltage battery 12 and the motor generator 10 into a low voltage (i.e., a direct current voltage of 12 V) and outputs the converted voltage. The DC-DC converter 21 carries out such a voltage conversion operation in response to the control signal from the control circuit 20.

The terminals of the fuses 22 are connected to the output terminal of the DC-DC converter 21, and the other terminals thereof are connected to terminals of the switch elements 23, which are connected to the low-voltage loads 15. The fuses 22 fuse to break currents when over-currents flow into the low-voltage loads 15. The switch elements 23 open and close in response to control signals inputted to control terminals (not shown) thereof from the control circuit 20 and controls the supply of low-voltage direct currents to the low-voltage loads 15.

The load switch 19 is used for controlling on/off of the low-voltage loads 15. The load switch 19 is provided in plural, corresponding to the respective low-voltage loads 15. Signals indicating on/off of the load switches 19 are supplied to the control circuit 20.

Next, description will be made for an operation of the vehicular power supply device constituted as described above with reference to a flowchart of FIG. 2. Note that, hereinafter, description will be made mainly for the control of charge/discharge of the first low-voltage battery 13a and the second low-voltage battery 13b, which is the feature of the present invention. This control is carried out by battery control processing routing in the control circuit 20, which is called in a constant cycle in a steady state to be described later.

First, when an ignition switch (not shown) is turned on, the control circuit 20 stops an operation of the DC-DC converter 21 by sending a control signal thereto and starts the motor generator 10. Thus, the motor generator 10 starts power generation. Thereafter, while monitoring a state of the motor generator 10, the control circuit 20 is on standby until rotation of the motor generator 10 is stabilized. In this state, the direct current power of 42 V is supplied to the input terminal of the DC-DC converter 21 and the high-voltage load 14.

In the above-described state, when the control circuit 20 determines that the rotation of the motor generator 10 has been stabilized, the control circuit activates the DC-DC converter 21 by sending a control signal thereto. The DC-DC converter 21 starts the voltage conversion operation in response to this control signal. Specifically, the DC-DC converter 21 converts the direct current power of the high voltage (42 V) into the direct current power of the low voltage (12 V) and outputs the converted power from the output terminal thereof. This direct current power of the low voltage is supplied to the input terminals of the switch elements 23 through the fuses 22.

Moreover, the control circuit 20 turns off the first switch 16a and the second switch 16b by sending control signals to the first switch drive circuit 17a and the second switch drive circuit 17b. Thus, the vehicular power supply device enters the steady state. Accordingly, in the steady state, the low-voltage loads 15 are driven only by the power from the DC-DC converter 21. When power consumption of the low-voltage loads 15 exceeds the maximum output power capacity of the DC-DC converter 21 due to an inrush current of the load, the first low-voltage battery 13a and the second low-voltage battery 13b supply power amounting to a shortage, which is a difference between the power consumption and the maximum output power capacity.

In the above-described steady state, discharge processing and charge processing of the low-voltage batteries are sequentially executed. In the discharge processing, first, the control circuit 20 reads a setting state of the load switch 19 therefrom as shown in the flowchart of FIG. 2 (Step S10). Then, based on information thus read, examination is made as to whether or not the low-voltage loads 15 such as lamps are many, which require the inrush currents. Specifically, examination is made as to whether or not the maximum power consumption required for the turned-on low-voltage loads 15 is larger than a specified value (Step S11). Such examination is carried out by referring to a table (not shown) storing the inrush currents of the low-voltage loads 15, which are stored in the control circuit 20.

Here, when determination is made that the low-voltage loads 15 requiring the inrush currents are many, any one of the first switch 16a and the second switch 16b or both thereof are turned on, depending on the maximum power consumption of the low-voltage loads 15 with the setting state of ON (Step S12). Thus, a shortage of the power is avoided, when the low-voltage loads 15 are started and the maximum power consumption of the low-voltage loads 15 exceeds the maximum output power capacity of the DC-DC converter 21 due to occurrence of the inrush currents.

Note that, in this case, the control circuit 20 can be also constituted to control the DC-DC converter 21 so as to output constant power when the low-voltage loads 15 are only the ones continuously driven such as headlamps. Moreover, when the low-voltage loads 15 are only the ones such as a horn, which are started accompanied with the inrush currents and driven for a short period, the control circuit 20 can be also constituted to stop the output of the DC-DC converter 21 and to control the first switch 16a and the second switch 16b so as to supply power only from the first low-voltage battery 13a and/or the second low-voltage battery 13b.

In the above Step S11, when determination is made that the low-voltage loads 15 requiring the inrush currents are a little, a comparison is made between a charge amount of the first low-voltage battery 13a and a charge amount of the second low-voltage battery 13b (Step S13). Then, when the charge amount of the first low-voltage battery 13b is lower than the charge amount of the second low-voltage battery 13b, the first switch 16a is turned on (Step S14). Thus, power is supplied from the first low-voltage battery 13a to the low-voltage loads 15.

On the other hand, when the charge amount of the first low-voltage battery 13a is larger than the charge amount of the second low-voltage battery, the second switch 16b is turned on (Step S15). Thus, power is supplied from the second low-voltage battery 13b to the low-voltage loads 15. Processing in the above Steps S13 to S15 is executed, whereby a low-voltage battery having a smaller charge amount supplies power to the low-voltage loads 15 prior to the other low-voltage battery when the low-voltage loads 15 requiring the inrush currents are a little. Note that, when the low-voltage battery having a smaller charge amount is empty, power is supplied from the other low-voltage battery.

Note that, simultaneously with the above processing, the control circuit 20 calculates a discharge current amount (charge amount) based on currents taken out of the first low-voltage battery 13a and the second low-voltage battery 13b, which are detected by the first detector 18a and the second detector 18b, and then stores the calculated discharge current amount (charge amount) in a memory (not shown). This discharge amount is used for determination of a priority order of the charge in charge processing to be described below.

Next, charge processing is carried out. In this charge processing, the control circuit 20 first examines whether or not the low-voltage batteries can be charged (Step S16). Specifically, based on the information read in Step S10, the control circuit 20 examines whether or not no low-voltage loads 15 are turned on, or examines whether or not the DC-DC converter 21 leaves an output power capacity sufficient for charging one low-voltage battery even if the turned-on low-voltage load 15 exists.

Here, when determination is made that the low-voltage batteries cannot be charged, the following processing is skipped, and the battery control processing is ended.

On the other hand, when determination is made that the low-voltage batteries can be charged, the control circuit 20 examines whether or not the first low-voltage battery 13a and the second low-voltage battery 13b are fully charged (Step S17). Such examination is carried out in such a manner that currents flowing respectively into the first low-voltage battery 13a and the second low-voltage battery 13b when turning on the first switch 16a and the second switch 16b are detected respectively by the first detector 18a and the second detector 18b, and charge current amounts calculated based on a result of such detection are examined. Moreover, the control circuit 20 examines voltage values of + (plus) terminals (not shown) of the first low-voltage battery and the second low-voltage battery.

Here, when determination is made that both of the first low-voltage battery 13a and the second low-voltage battery 13b are fully charged, the control circuit 20 lowers or stops the output of the DC-DC converter 21 depending on an amount of the power consumption of the low-voltage loads 15 (Step S18). Thus, a waste of the power by the DC-DC converter 21 is suppressed.

On the other hand, when determination is made that at least one of the first low-voltage battery 13a and the second low-voltage battery 13b is not fully charged, on/off of the first switch 16a and the second switch 16b is controlled in accordance with a priority order (Step S19). The priority order is determined based on the discharge current amount (charge amount) stored in the memory in the control circuit 20. Then, charge is performed sequentially from a low-voltage battery having a higher priority order (a larger discharge current amount). In this case, the output power capacity of the DC-DC converter 21 is controlled according to needs. As above, the battery control processing is ended.

Next, description will be made in more detail for the operation carried out in the above-described Step S19. FIG. 3A shows an example of a transition of a charge current IBAT when neither the first low-voltage battery 13a nor the second low-voltage battery 13b is fully charged and the priority of the first low-voltage battery 13a is higher than the priority of the second low-voltage battery 13b.

When the first switch 16a is turned on, first, the charge current IBAT by an inrush current of a value Ia flows into the first low-voltage battery 13a, and a charge thereof is started. This charge current IBAT is gradually reduced with the elapse of time, and at a point of time when a time T passes, the first switch 16a is turned off to complete the charge operation. At the same time of this completion, the second switch 16b is turned on, and the charge current IBAT by the inrush current of the value Ia flows to the second low-voltage battery 13b, thus a charge thereof is started. This charge current IBAT is gradually reduced with the elapse of time, and at a point of time when the time T passes, the charge operation is completed.

FIG. 3B shows an example of a transition of the charge current IBAT of a low-voltage battery when the low-voltage battery is only one as a supplementary power supply. When the low-voltage battery is only one as a supplementary power supply, a capacity of the low-voltage battery is approximately twice as much as that of the first low-voltage battery 13a or that of the second low-voltage battery 13b. Therefore, the amount of the inrush current will be twice (2Ia) or more. Specifically, the charge current IBAT by the inrush current of a value 2Ia or more first flows into the low-voltage battery, and a charge thereof is started. This charge current IBAT is gradually reduced with the elapse of time, and at the point of time when the time T passes, the charge operation is completed.

In order to deal with the charge operation as described above, the DC-DC converter 21 in the first embodiment has an output power capacity IOUT as shown in FIG. 4A. Specifically, the DC-DC converter 21 can output power Ic to be supplied to the first low-voltage battery 13a and the second low-voltage battery 13b as well as power Ib to be supplied to the low-voltage loads 15.

On the other hand, when the low-voltage battery is only one as a supplementary power supply, the DC-DC converter requires an output power capacity as shown in FIG. 4B. Specifically, in order to deal with the inrush current described above, the DC-DC converter requires power twice as much as that for the DC-DC converter 21 according to the first embodiment or more (2 Ic or more) for an amount of power to be supplied to the low-voltage battery. Accordingly, it is necessary to increase the output power capacity of the DC-DC converter, and to enlarge the converter in size.

As described above, according to the DC-DC converter 21 according to the first embodiment, since the capacity of each of the first low-voltage batter 13a and the second low-voltage battery 13b is approximately a half of the capacity of the conventional low-voltage battery, the inrush current will be less than a half of the inrush current of the conventional low-voltage battery or lower. Therefore, the output power capacity of the DC-DC converter 21 can be reduced, thus enabling miniaturization thereof.

As described above, according to the vehicular power supply device according to the first embodiment, the two low-voltage batteries is connected in parallel, each having the capacity smaller than that of the conventional low-voltage battery. When the power consumption required by the low-voltage loads is large, the power is supplied simultaneously from the two low-voltage batteries, whereby the power supplied from one low-voltage battery will be a half, and the current required for the charge thereof will be a half. Consequently, the low-voltage battery is less deteriorated, and a lifetime thereof will be prolonged.

Moreover, the capacity of each of the first low-voltage battery 13a and the second low-voltage battery 13b is made approximately half of the capacity of the conventional low-voltage battery, and the charge thereof is carried out sequentially. Therefore, though the charge time is approximately twice as much as that of the conventional one, the amount of the inrush current can be reduced in approximately half of that of the conventional low-voltage battery. Consequently, the output power capacity of the DC-DC converter 21 can be reduced, thus achieving miniaturization thereof.

Furthermore, when the power consumption is small during the drive of the low-voltage loads 15, the supply of power is started from one low-voltage battery having a smaller charge amount. Therefore, the other low-voltage battery can be always maintained in a state of having a large amount of charge or of being fully charged. Accordingly, since the other low-voltage battery can be used as an auxiliary, it is possible to provide a vehicular power supply device capable of avoiding a trouble due to battery depletion.

Second Embodiment

In a vehicular power supply device according to a second embodiment of the present invention, only the control circuit is accommodated in the junction box, and the DC-DC converter is provided outside the junction box.

Figure 5:
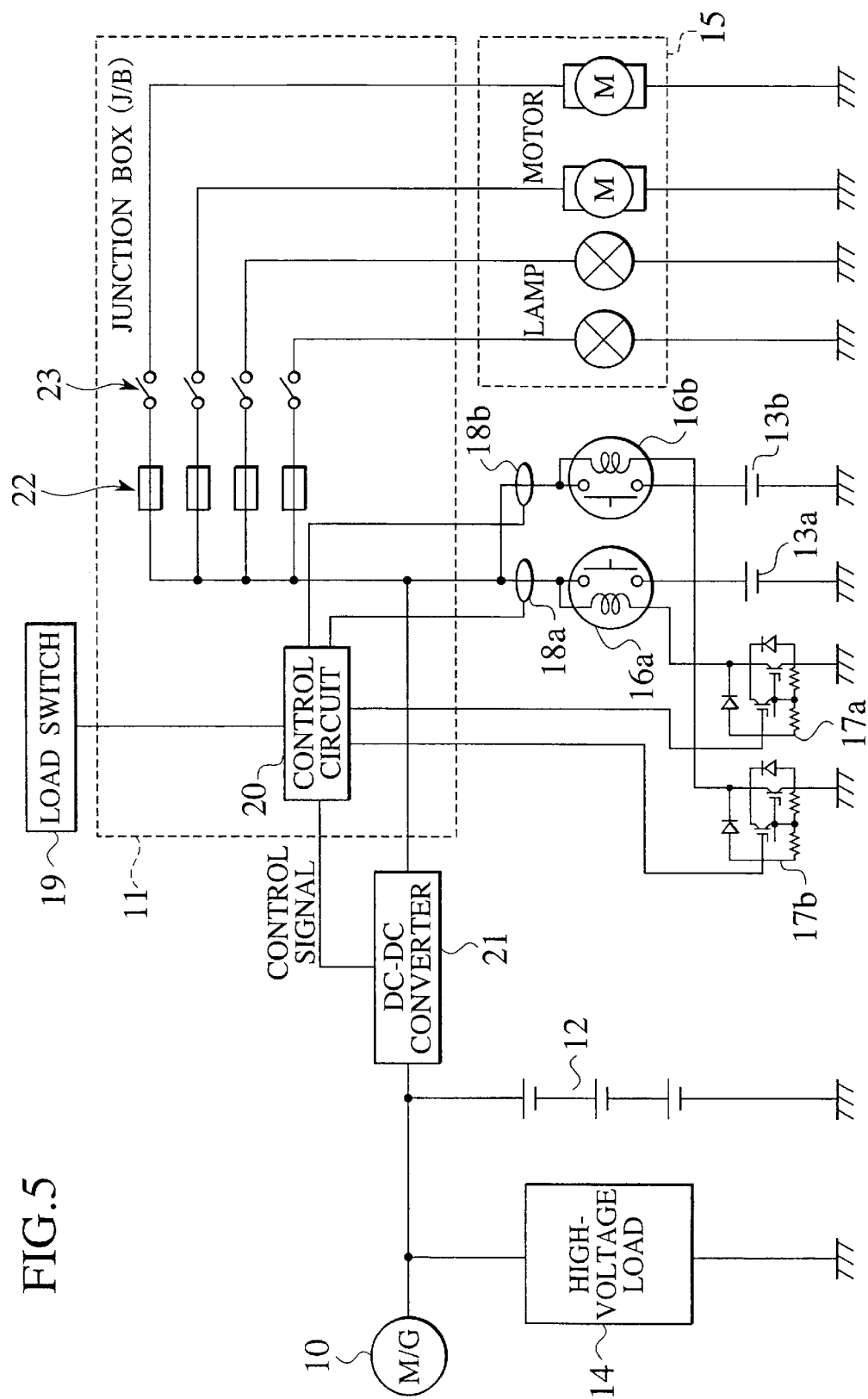
FIG. 5 is a block diagram showing a configuration of a vehicular power supply device according to a second embodiment of the present invention.

FIG. 5 is a block diagram showing a configuration of the vehicular power supply device according to the second embodiment. The configuration and operation of the vehicular power supply device of this embodiment is the same as those of the above-described first embodiment except that the DC-DC converter 21 is provided outside the junction box 11. Accordingly, detailed description for the configuration and the operation will be omitted.

According to the vehicular power supply device according to the second embodiment, the DC-DC converter 21 is disposed outside the junction box 11. Therefore, in addition to the effect obtained by the vehicular power supply device according to the above-described first embodiment, flexibility in positioning the DC-DC converter 21 and the junction box 11 is increased, thus simplifying design of the vehicular power supply device.

The invention may be practiced or embodied in other ways without departing from the sprit or essential character thereof. For instance, the number of low-voltage batteries is arbitrary without being limited to two. And the supply source of the low-voltage power is not limited to the DC-DC converter and may be a generator, such as an alternator. Moreover, as each of the first and second low-voltage batteries, a lead-acid battery, an electric double layer capacitor or the like can be used.

The preferred embodiments described herein are therefore illustrative and not restrictive, the scope of the invention being indicated by the claims, and all variations which come within the meaning of claims are intended to be embraced herein.

What is claimed is:

1. A vehicular power supply device, comprising:
   a generator generating power;
   a high-voltage battery being charged with power outputted from the generator, the high-voltage battery supplying the charged power to a high-voltage load;
   a voltage converter converting an output voltage of the high-voltage battery into another voltage; and
   a plurality of low-voltage batteries respectively being connected to the voltage converter in parallel and being charged with power outputted from the voltage converter, the low-voltage battery supplying the charged power to a low-voltage load.

2. The vehicular power supply device according to claim 1, further comprising: a control circuit selecting at least one low-voltage battery for supplying the power required for driving the low-voltage load among the plurality of low-voltage batteries.

3. The vehicular power supply device according to claim 2, wherein the control circuit allows the plurality of low-voltage batteries to be sequentially charged with the power outputted from the voltage converter.

4. The vehicular power supply device according to claim 3, further comprising: a detector for detecting a charge amount of the low-voltage battery, wherein, when the power required for driving the low-voltage load is smaller than a predetermined value, the control circuit allows a low-voltage battery having a small charge amount detected by the detector to be used for supplying the power prior to the other low-voltage batteries.

5. The vehicular power supply device according to claim 4, wherein the detector is configured with a current sensor for detecting a charge/discharge current of the low-voltage battery and a voltage sensor for detecting a voltage of a terminal thereof, the current and the voltage detected by the detector are sent to the control circuit, the control circuit calculates the charge amount based on the charge/discharge current and stores the calculated charge amount.

6. The vehicular power supply device according to claim 2, further comprising: a box for accommodating the voltage converter and the control circuit.

7. The vehicular power supply device according to claim 2, further comprising: a box for accommodating the control circuit wherein the voltage converter is provided outside of the box.

* * * * *